Dec. 2, 1924.

E. W. MELVIN

VULCANIZER

Filed Aug. 19, 1922

1,517,517

ERNEST W. MELVIN
INVENTOR

BY Hadley Freeman
ATTORNEY

Patented Dec. 2, 1924.

1,517,517

UNITED STATES PATENT OFFICE.

ERNEST W. MELVIN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

VULCANIZER.

Application filed August 19, 1922. Serial No. 582,890.

*To all whom it may concern:*

Be it known that I, ERNEST W. MELVIN, a citizen of the United States, and a resident of Milwaukee, in the county of Milwaukee and State of Wisconsin, have invented certain new and useful Improvements in Vulcanizers, of which the following is a specification.

Upon inspecting inner tubes after they have been cured some are found to have slight defects such as small pin holes. It is customary to repair these defects and sell the tubes as seconds. Heretofore these defects have been repaired by clamping the tube between two flat members one of which is heated to vulcanizing temperature. This produces a discoloration of the tube over the entire area of the members and also shows the impression of the members and such discoloration and impression is objectionable. My invention provides means for repairing these tubes without producing unnecessary discoloration and impression of the members.

In the drawings accompanying this specification and forming a part thereof I have shown, for purpose of illustration, one form which my invention may assume. In these drawings:—

Figure 1 is a side elevation of this illustrative embodiment, while

Figure 1:
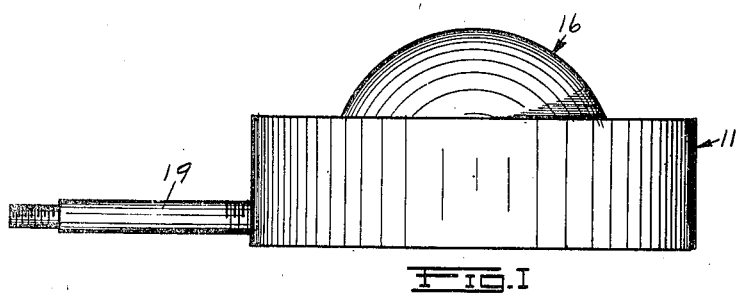
Figure 2:
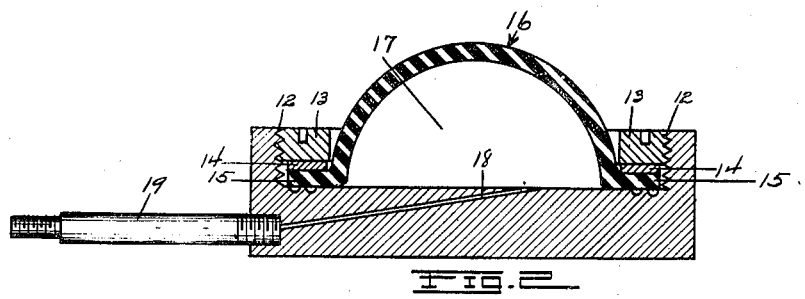
Figure 2 is a cross-sectional view of this illustrative embodiment.

In the drawings I have shown a base 11 screw-threaded at 12 to receive the correspondingly screw-threaded ring 13 adapted to engage a ring 14 which in turn overlies the flange 15 of a flexible ball-shaped member 16 which may be made of rubber or rubberized fabric. When the ring 13 is rotated it rides on the ring 14 to securely fasten the spherical member 16, without distorting it, to the base 11 to form an air chamber 17. The base 11 is also provided with an aperture 18 and a valve 19 to admit air into the chamber 17.

In using this device the ball-shaped member 16 is inflated to form a suitably rigid secondary member for the repair vulcanizer and the tube placed with the defective portion directly above the ball-shaped member and the clamps (not shown) tightened until the ball is depressed to contact over the defective area. It is obvious that in this way any discoloration or impression is confined to the defective area and usually will be almost imperceptible.

I have disclosed a specific embodiment of my invention but this disclosure is illustrative only and my invention is not limited thereto.

I claim:

1. A secondary member for an inner tube repair vulcanizer comprising a resilient spherical member adapted to contact only the defective area of the tube.

2. A secondary member for an inner tube repair vulcanizer comprising a resilient spherical member adapted to be depressed to contact over a greater area of the tube.

3. A secondary member for an inner tube repair vulcanizer comprising an inflatable resilient convex member adapted for variable contact with the surface of the tube so as to contact only with the defective area thereof.

4. A secondary member for an inner tube repair vulcanizer comprising a base, an inflatable resilient convex member adapted to selectively engage only the defective area of the tube, and means adapted to engage said inflatable member to fasten it to said base to form an air chamber.

5. A secondary member for an inner tube repair vulcanizer comprising an inflatable spherical member adapted to be depressed to contact over a greater area of the tube, means adapted to engage said spherical member to fasten it to a base to form an air chamber, and a base provided with an aperture which is in communication with an air valve and said air chamber.

6. A secondary member for a repair vulcanizer comprising a resilient convex member adapted to be variably distorted to contact over a correspondingly varying area.

In testimony whereof I have signed my name to the above specification.

ERNEST W. MELVIN.